United States Patent [19]

Olson et al.

[11] E Re. 30,021

[45] Reissued Jun. 5, 1979

[54] MATERIAL HANDLING MACHINE

[75] Inventors: Eugene Olson, Wausau; Salvatore F. Aiello, Racine, both of Wis.

[73] Assignee: Loed Corporation, Wausau, Wis.

[21] Appl. No.: 690,051

[22] Filed: May 26, 1976

Related U.S. Patent Documents

Reissue of:

[64] Patent No.: 3,836,025
Issued: Sep. 17, 1974
Appl. No.: 362,199
Filed: May 21, 1973

[51] Int. Cl.[2] ..... B60P 1/48

[52] U.S. Cl. ..... 414/547; 212/55; 414/718

[58] Field of Search ..... 214/77 R, 75, 78, 80, 214/130 R, 131 R, 140, 141, 770, 771, 762, 763, 138 R; 212/35 R, 41, 42, 43, 55, 58 R, 59 R, 8 R, 7

[56] References Cited

U.S. PATENT DOCUMENTS

| | | | |
|---|---|---|---|
| 2,951,601 | 9/1960 | Castoe | 214/86 A |
| 3,056,510 | 10/1962 | Garnett | 212/59 R |
| 3,184,086 | 5/1965 | Lull | 214/770 |
| 3,270,899 | 9/1966 | Brown et al. | 214/77 R |
| 3,307,713 | 3/1967 | Bopp | 212/55 |
| 3,329,291 | 7/1967 | Przybylski et al. | 214/141 |
| 3,335,879 | 8/1967 | Shaffer | 214/75 R |
| 3,463,335 | 8/1969 | Brownell et al. | 214/762 |
| 3,469,712 | 9/1969 | Haulotte | 212/55 |
| 3,554,395 | 1/1971 | Dunbar | 212/35 R |
| 3,633,702 | 1/1972 | Shaw | 212/59 R |

FOREIGN PATENT DOCUMENTS

| | | | |
|---|---|---|---|
| 728362 | 4/1955 | United Kingdom | 214/140 |

*Primary Examiner*—Albert J. Makay
*Assistant Examiner*—Ross Weaver
*Attorney, Agent, or Firm*—Allegretti, Newitt, Witcoff & McAndrews

[57] ABSTRACT

A self-propelled, low profile material-handling vehicle mounted on a pair of front wheels and a pair of rear wheels. The vehicle supports an extendible boom rotatable around a horizontal pivot axis that is substantially located above the rear wheels. A cab for a driver is located on one side of the boom, and a load-carrying platform is located on the side of the boom opposite the cab. A well located in the vehicle body between the cab and the load-carrying platform is positioned lower than the pivot axis of the boom and is arranged to receive the boom when it is pivoted downward toward the front wheels so that a load can be maneuvered below grade level. The pivot axis is vertically located above the top of the wheels and below the top of a steering wheel located within the cab so that the driver's vision is substantially unobstructed when a load is carried by the boom close to the grade level.

22 Claims, 13 Drawing Figures

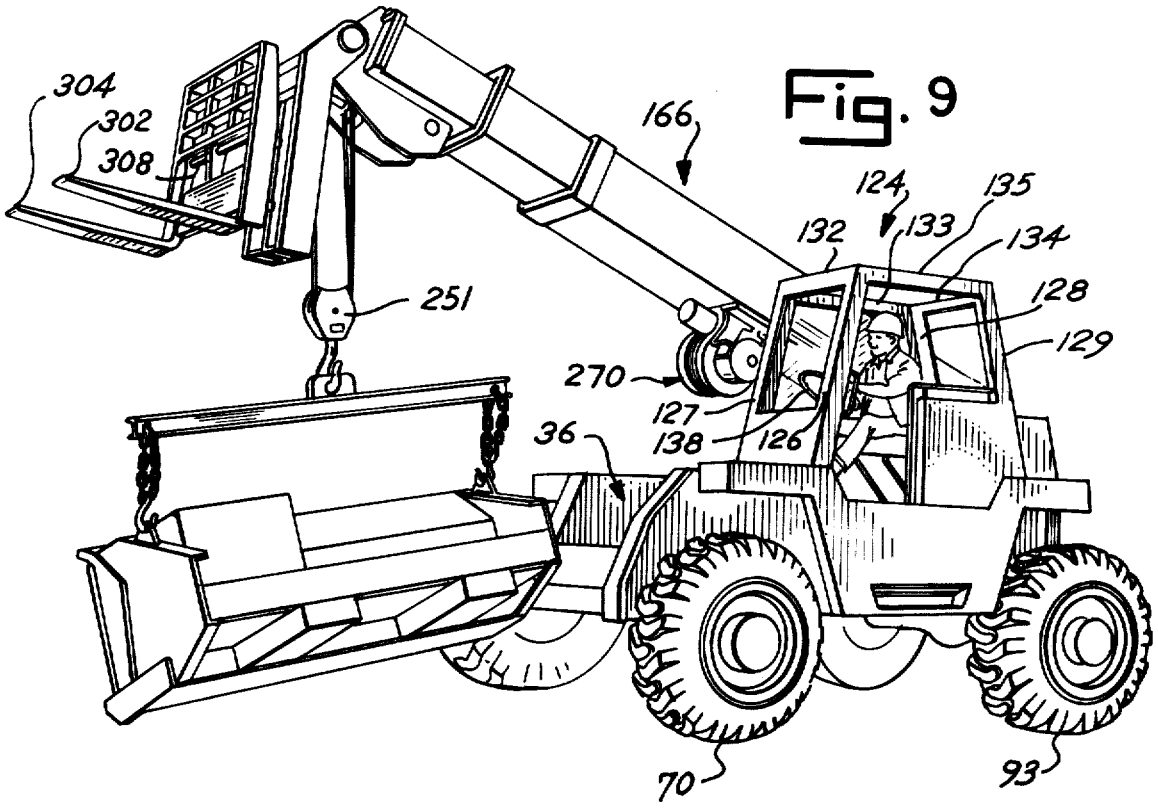
Fig. 9
Fig 10
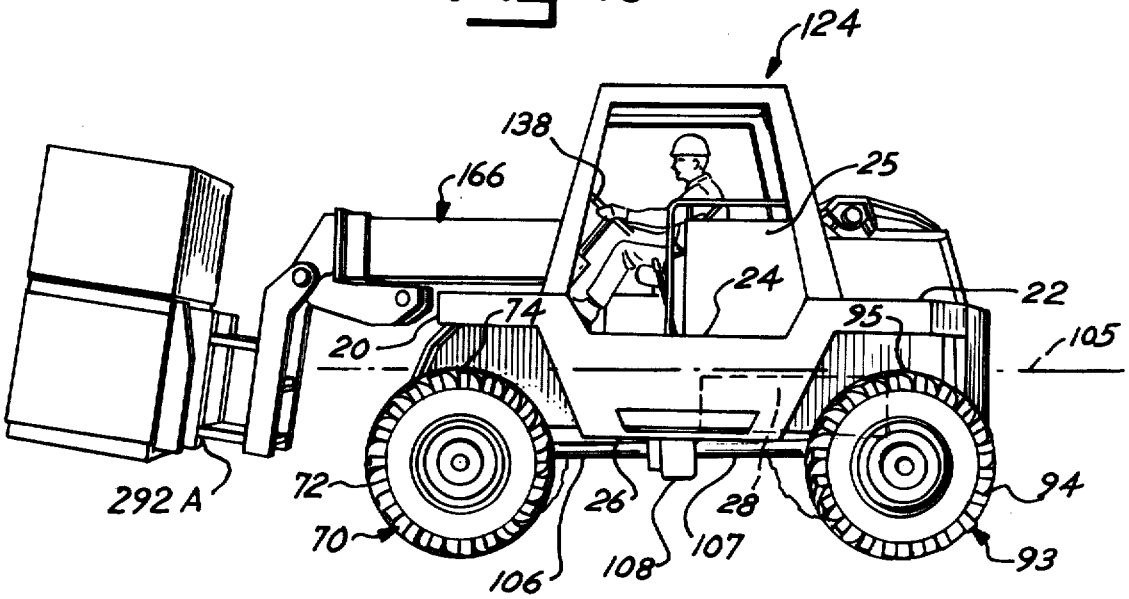

MATERIAL HANDLING MACHINE

Matter enclosed in heavy brackets [ ] appears in the original patent but forms no part of this reissue specification; matter printed in italics indicates the additions made by reissue.

*REFERENCE TO RELATED APPLICATION*

*This is a Reissue Application of our U.S. Pat. No. 3,836,025, dated Sept. 17, 1974.*

BACKGROUND OF THE INVENTION

This invention relates to self-propelled, material-handling vehicles, and more particularly relates to such vehicles which employ an extendible boom.

Over the past decade, experience has revealed the need for a material-handling vehicle which can be used in the construction, manufacturing and warehousing industries. Such a vehicle must have the reach capability of a conventional overhead crane and the maneuverability and compactness generally attributed to a conventional fork lift truck. In order to be useful, such a vehicle must have a boom capable of raising a heavy load to the top of a multi-story building and must have a low profile and short wheel base that enable operation within a warehouse or stock-piling yard.

In the past, vehicles capable of lifting heavy loads to a substantial height have not been capable of also performing as a conventional fork lift truck. One such prior art machine comprises a vehicle body mounted on wheelbearing front and rear axles. A cab for a driver is centrally located over the front axle, and a boom is rotatably mounted on a pivot axis located substantially over the rear axle and above the top of the cab so that the boom extends forward over the cab. A fork is attached to a support member that extends in front of the cab and is connected to the free end of the boom. An engine which powers the vehicle is located over the rear axle, and the major portion of the engine is located above the rear wheels.

While such a vehicle is capable of lifting loads to a substantial height, the vehicle is relatively useless in an environment requiring small size and unimpaired visibility by the driver, such as a warehouse. The mounting of the boom above the cab creates a vehicle which is too high to go through many warehouse archways, and the support member extending in front of the cab impairs the vision of the driver. Moreover, the vehicle has a relatively high center of gravity which increases the moment arm created around the front axle during deceleration of the vehicle, such as during braking. When the vehicle is carrying a heavy load on the fork, this moment arm tends to pitch the vehicle forward and to lift the rear wheels off the ground during braking. The problem is accentuated when the boom is extended to any substantial extent. As a result of this deficiency, the vehicle tends to be unstable when it is maneuvered with a heavy load.

In addition to the foregoing deficiencies, the vehicle provides no means for simultaneously carrying a load on the fork and a portion of the vehicle body. This deficiency limits the physical size of the load which can be safely carried by the vehicle. The vehicle also is not capable of maintaining a load at the same elevation above the ground level as the boom is extended and retracted. This deficiency limits the ability of the driver to conveniently maneuver a load. In addition, the position of the boom over the cab of the vehicle prevents the boom from extending into an excavation so that a load may be maneuvered below the grade level.

SUMMARY OF THE INVENTION

In order to overcome the deficiencies of the prior art vehciles, the applicants have invented a unique and versatile vehicle having attributes of both an overhead construction crane and a fork lift truck capable of relatively high speed maneuverability in confined areas. By arranging the components of the vehicle in a unique manner, the applicants are able to substantially reduce the center of gravity, thereby increasing the weight of a load which may be safely maneuvered by the vehicle during deceleration. Moreover, by providing a well in the vehicle body and by strategically placing a boom over the well and between a driver's cab and load-carrying platform, applicants have been able to create a vehicle capable of maneuvering a load below grade level and of carrying a load close to the ground without impairing the vision of a driver operating the vehicle.

According to another feature of the invention, the boom mounted on applicant's vehicle employs a unique extending and retracting mechanism which provides smooth and trouble-free operation at minimum cost.

According to another feature of the invention, a fork is located on the front of the boom and means are provided for pivoting the fork so that a load can be simultaneously carried on the fork and on the load-carrying portion of the vehicle body. In addition, a drop block is simultaneously carried on the boom adjacent the fork so that a load can be handled by either the fork or the drop block, or both.

According to another feature, the vehicle is provided with means for maintaining the drop block hook a constant height above the grade level as the boom is extended and retracted so that the maneuverability of a load held by the drop block is increased. In addition, a control system maintains the fork at the same relative attitude with respect to the ground as the boom is raised and lowered.

DESCRIPTION OF THE DRAWINGS

These and other advantages and features of the present invention will hereafter appear in connection with the accompanying drawings showing a preferred embodiment of the invention in which:

FIGS. 9–13 are pictorial views of the vehicle shown in FIG. 1 performing various material-handling operations.

DESCRIPTION OF THE PREFERRED EMBODIMENT

Figures 1, 2, 2A:
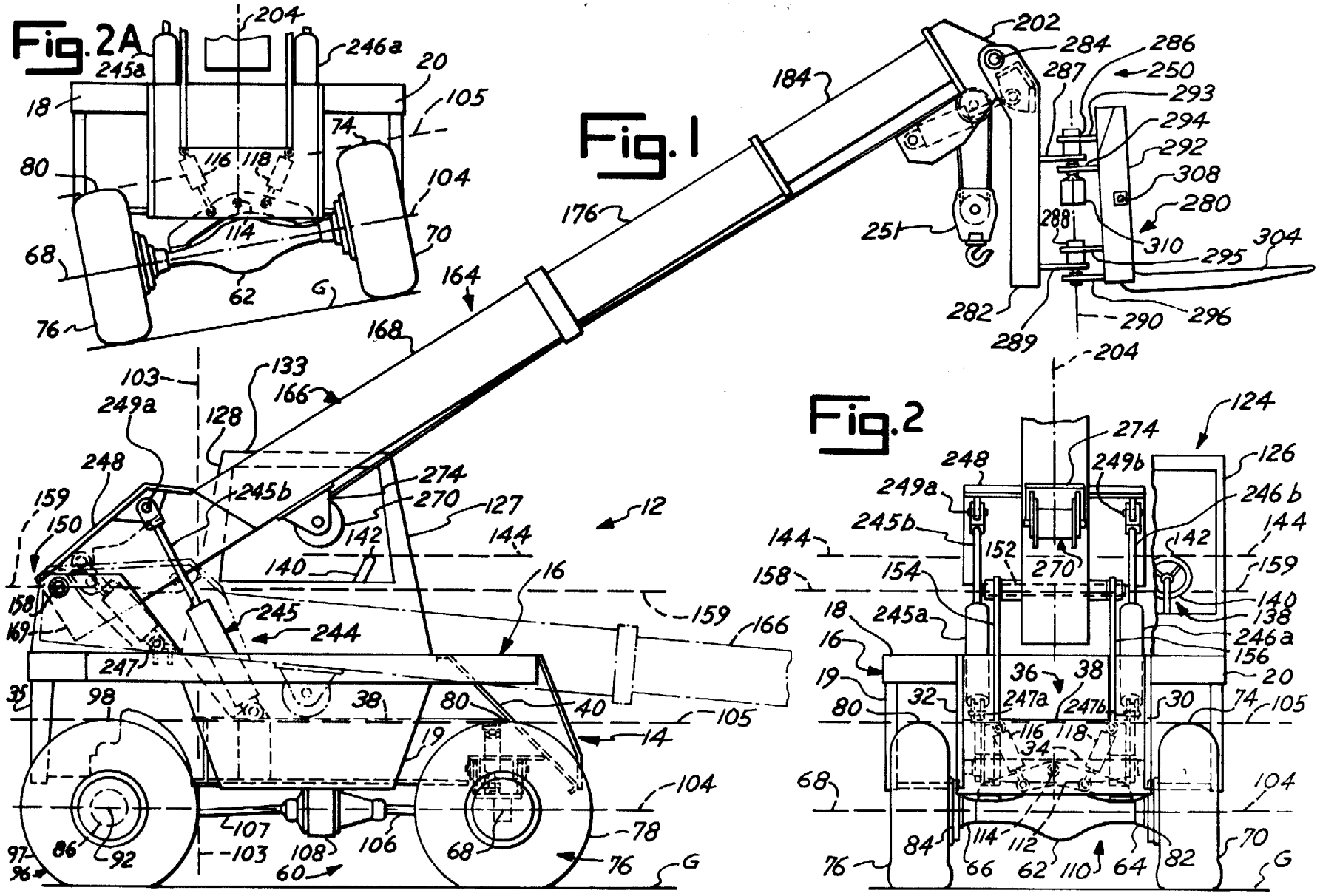
FIG. 1 is a side elevational view of a preferred form of material-handling vehicle made in accordance with the present invention showing a rotatable boom thereof in a raised position in soid lines and in a lowered position in phantom lines.
FIG. 2 is a front elevational view of the vehicle shown in FIG. 1 in which the top portion of the boom is broken away.
FIG. 2A is a fragmentary, front elevational view of the apparatus of FIG. 2 illustrating the manner in which the sway cylinders maintain the vehicle in an upright position on an uneven grade surface.

Referring to the drawings, a preferred form of vehicle 12 embodying the present invention basically comprises a body 14, an axle and wheel assembly 60, a suspension assembly 110, a cab 124, a pivot assembly 150, a boom assembly 164, a boom extending assembly 206, a hoisting assembly 244, and a load-carrying assembly 250.

Referring to FIGS. 1–3, 10 and 12, body 14 comprises a load-carrying platform 16 having a flat, horizontal, upper surface 18. The underside of the vehicle is protected by a right-hand depending shield plate 19 attached to the underside of platform 16. The vehicle has a left front fender 20 and a left rear fender 22 that are joined by a platform 24 which forms the floor of cab 124 (FIG. 10).

Figure 3:
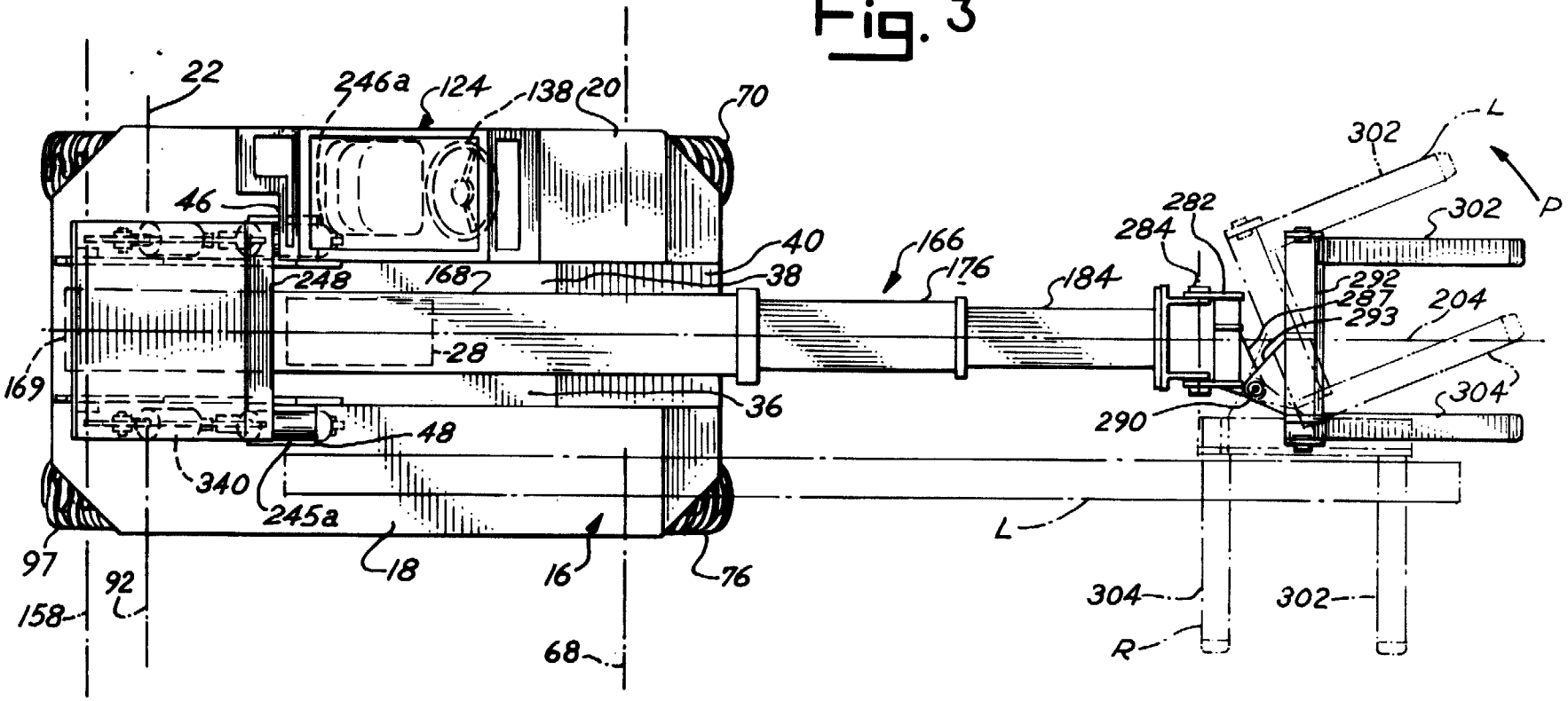
FIG. 3 is a top plan view of the vehicle shown in FIG. 1 in which the boom is lowered to a substantially horizontal position and in which a fork is shown in its forward position in solid lines and is shown in its side-pivoted position in phantom lines.
Figures 4, 5, 6, 7:
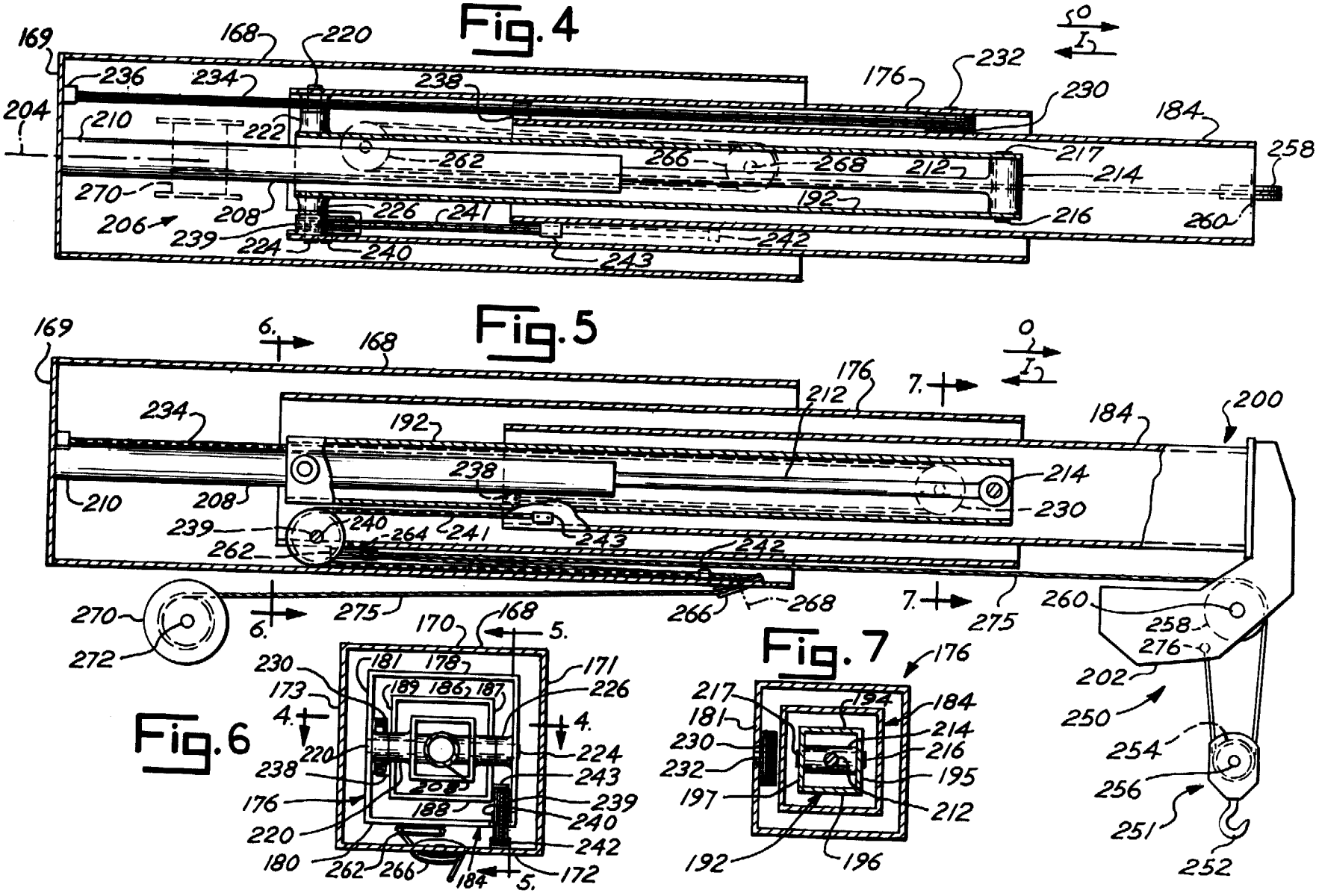
FIG. 4 is an enlarged, cross-sectional, fragmentary view of the boom shown in FIG. 1 taken substantially along line 4—4 of FIG. 6.
FIG. 5 is a cross-sectional view of the boom taken along line 5—5 of FIG. 6.
FIG. 6 is a cross-sectional view of the boom taken along line 6—6 of FIG. 5.
FIG. 7 is a cross-sectional view of the boom taken along line 7—7 of FIG. 5.

Referring to FIGS. 3 and 10, platform 24 supports an underslung housing 26 which carries an engine 28 under a well 26. The engine preferably comprises a 103 horsepower water-cooled internal combustion engine capable of propelling the vehicle up to about 20 miles per hour. A major portion of the engine is located below a plane drawn through the top points of the wheels. This is an important featue since it reduces the center of gravity of the vehicle. As a result, the vehicle is able to decelerate with a heavier load than would otherwise be possible. A one spot service compartment is located behind an access door 25 (FIG. 10). In the compartment are all of the daily maintenance check items like fuel, oil check and add, air cleaner, battery, hydraulic fluid level gauge, hydraulic tank, radiator fill and tool box.

Figure 12:
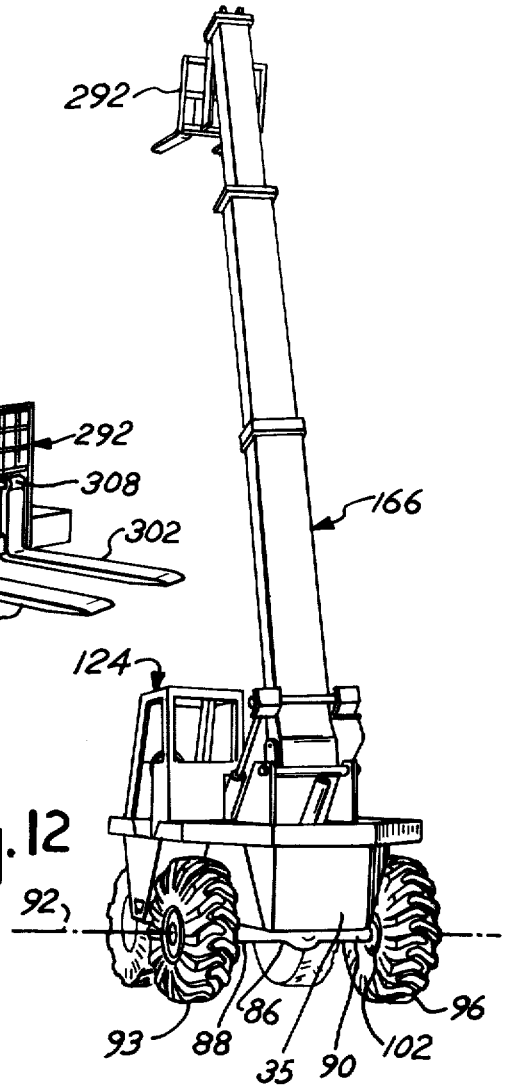

Referring to FIG. 2, body 14 also comprises a front traverse frame member 34 and a corresponding rear traverse frame member (not shown). A depending counter weight 35 helps to balance the vehicle when the boom is extended. (FIGS. 1 and 12).

Referring to FIGS. 1–3, a well 36 is defined by a horizontal flat plate member 38 and the upper portions of walls 30 and 32. The front part of the well is partially enclosed by a slanting front plate 40 and the rear of the well is partially enclosed by a left-hand rear member 46 and a right-hand rear member 48. Members 46 and 48 also cover the hoisting cylinders of hoisting assembly 244. As shown in FIG. 1, the well is arranged to receive the boom when the boom is lowered into the position shown in phantom lines so that a load may be maneuvered below grade. This is an important feature since it enables loads positioned below grade level to be maneuvered with a fork or drop block.

Still referring to FIGS. 1–3, 10 and 12, axle and wheel assembly 60 comprises a front axle 62 having a left end portion 64, a right end portion 66 and an axis of rotation 68. A front, left-hand wheel 70 is rotatably mounted to end portion 64 of axle 62. Wheel 70 has an outer periphery that defines a circle 72 having an upper point 74. A front, right-hand wheel 76 is rotatably mounted to end portion 66 of axle 62. The wheel has an outer periphery that defines a circle 78 having an upper point 80. Drum-type brakes 82 and 84 provide a means of braking wheels 70 and 76, respectively.

Assembly 60 also comprises a split rear axle 86 having a left end portion 88, a right end portion 90, and an axis of rotation 92. A rear, left-hand wheel 93 is rotatably mounted to left end portion 88 of rear axle 86. The wheel has an outer periphery that defines a circle 94 having an upper point 95. Likewise, a rear, right-hand wheel 96 is rotatably mounted to right end portion 90 of rear axle 86. The wheel has an outer periphery that defines a circle 97 having an upper point 98. Drum type brakes 100 and 102 provide a means of braking rear wheels 93 and 96, respectively. The axes of rotation 68 and 92 of the front and rear axles define a plane 104 that is substantially horizontal to the ground level G. Upper points 74, 80, 95 and 98 lie in a plane 105 that is substantially parallel to plane 104. The points of circles 94 and 97 closest to front axle 62 lie in a plane 103 that is perpendicular to planes 104 and 105.

The wheels are driven by means of a front drive shaft 106, a rear drive shaft 107, and a transmission 108 that is coupled to engine 24. These components are arranged so that the vehicle has a 4-wheel drive capability.

Referring to FIG. 2, suspension assembly 110 comprises a front yoke 112 that is connected to front axle 62 and is rotatably mounted to frame member 34 by a pivot rod 114. Sway cylinders 116 and 118 are connected between yoke 112 and well member 38 so that load-carrying platform 16 remains substantially horizontal when the vehicle is used on rough terrain or when one of the front wheels must be operated in a depression in the ground. The manner in which the sway cylinders operate is shown in FIG. 2A.

Referring to FIGS. 1–3 and 9, cab 124 comprises side frame members 126, 127, 128, 129 and roof frame members 132, 133, 134 and 135 welded together as shown. A steering wheel 138 having an outer periphery that defines a circle 140 having an upper point 142 is located within the cab. Point 142 lies in a plane 144 that is parallel to the planes 104 and 105. The steering wheel is connected by conventional hydraulic linkage to the rear wheels so that the load can be positioned with maximum maneuverability.

Referring to FIGS. 1–3, pivot assembly 150 comprises a horizontal rod 152 that is journaled through brackets 154 and 156. The brackets are rigidly attached to the frame of the vehicle body beneath member 38 in the manner shown. The longitudinal axis of rod 152 defines a pivot axis 158 which lies in a plane 159 that is parallel to planes 104, 105 and 144.

Figure 13:
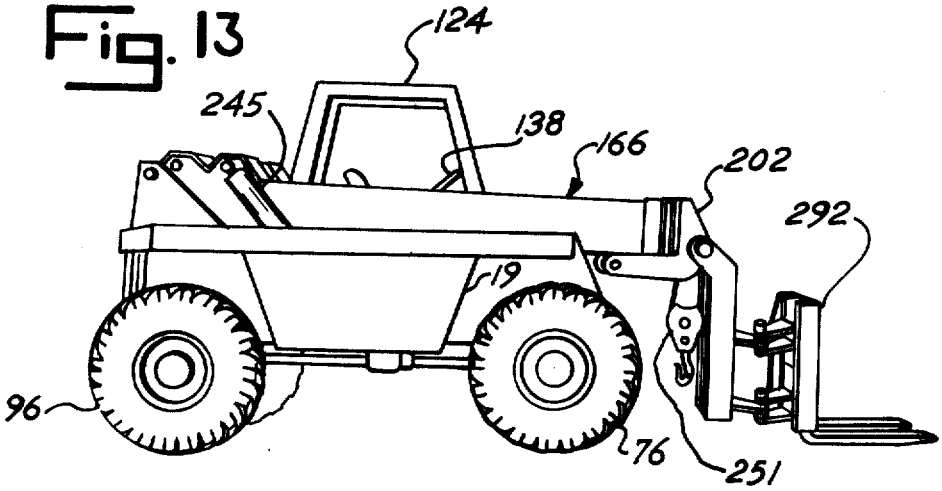

Referring to FIGS. 1–3, boom assembly 164 comprises a boom 166 that has a fixed section 168, a telescoping movable section 176 and another telescoping movable section 184. The boom assembly is rotatably mounted on rod 152. The rod is positioned relative to steering wheel 138 in the cab such that plane 159 lies between the plane 105 and plane 144. This is an important feature since it enables the boom to place a load below grade level and it also enables the driver to have substantially unobstructed vision when a load is carried adjacent the ground level as shown in FIGS. 10 and 13. Moreover, this placement of the rod maintains the center of gravity of the vehicle as low as possible commensurate with an ability to maneuver a load below grade level.

Referring to FIGS. 4–7, fixed section 168 of the boom comprises walls 170, 171, 172 and 173; movable section 176 of the boom comprises walls 178, 179, 180 and 181; and movable section 184 of the boom comprises walls 186, 187, 188 and 189. The boom also has an inner sleeve 192 comprising walls 194, 195, 196 and 197. Section 184 terminates in a load carrying end 200 which is connected to an end support member 202. The support member is not shown in FIG. 4 so that other portions of the apparatus may be more clearly seen.

Figure 11:
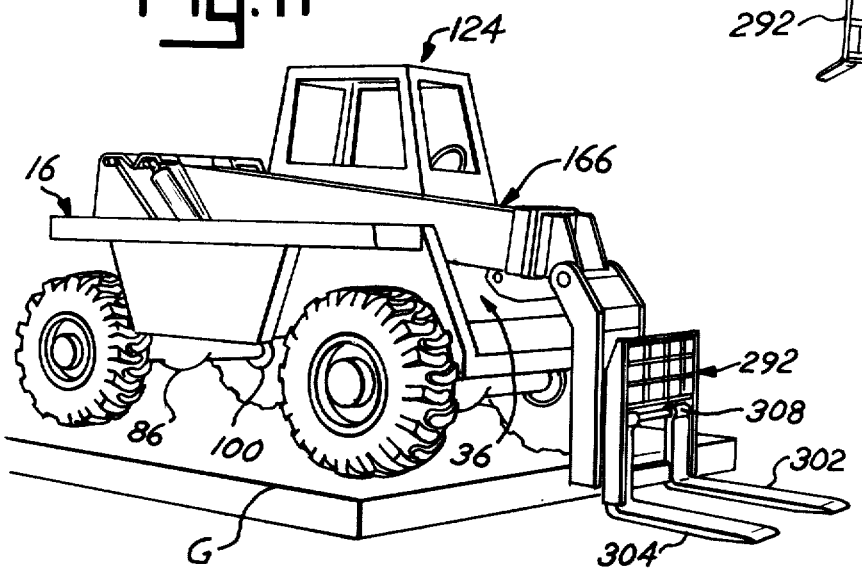

Referring to FIGS. 2 and 3, boom 166 is rotatable in an operating plane 204 that is substantially perpendicular to planes 104, 105, 144 and 158. It should be noted that cab 124 is located completely on one side of plane 204, whereas load-carrying platform 16 is located entirely on the opposite side of plane 204. This is an important feature since it enables well 36 to be strategically placed below the boom to enable the maneuvering of a load below ground level as shown in FIG. 11. In addition, the foregoing arrangement of vehicle components enables the driver to have a substantially unobstructed view of the load irrespective of the manner in which the boom is moved in plane 204.

Referring to FIGS. 4–7, boom extending assembly 206 comprises a hydraulic cylinder 208 having a rear end 210 that is attached to a rear wall 169 of boom 166. The cylinder is internally fitted with a reciprocating piston (not shown) that is attached to a connecting rod 212. The connecting rod terminates in a cylindrically-shaped head 214 that is connected to sleeve 192 by rods 216,217 that pass through walls 195 and 197, respectively. The foregoing components enable the sleeve to be moved by the extension and retraction of rod 212 within cylinder 208. The movement of the piston within cylinder 208 is controlled by conventional hydraulic fluid and valves not shown. The rear end of sleeve 192 is connected to section 176 of the boom by means of a rod 220 which passes through walls 181 and 197. A collar 222 spaces walls 181 and 197 with respect to each other. Sleeve 192 is also connected to section 196 by means of a rod 224 that passes through walls 179 and 195. The rod is surrounded by a collar 226 that spaces walls 179 and 195 with respect to each other.

A pulley 230 is rotatably attached to wall 181 of section 176 by a rod 232. A chain 234 is looped around pulley 230. One end of the chain is attached to rear wall 169 by a fixture 236 and the opposite end of the chain is attached to the rear end of section 184 by a fixture 238. A pulley 239 is rotatably attached to wall 179 of section 176 by a rod 240. A chain 241 is looped around pulley 239. One end of chain 241 is attached to the front end of section 168 by a fixture 242 and the opposite end of the chain is attached to wall 187 of section 184 by a fixture 243.

The pulleys and chains cooperate in order to move section 184 inward and outward with respect to section 176. For example, if rod 212 extends sleeve 192 outward so that section 176 is also moved outward in the direction of arrow O, pulley 230 is also moved outward so that chain 234 pulls fixture 238 and section 184 outward. Conversely, if rod 212 moves sleeve 192 and section 176 inward in the direction of arrow I, pulley 239 is moved inward so that chain 241 pulls fixture 243 and section 184 inward. This is an important feature since it enables both sections 176 and 184 to be simultaneously moved inward and outward by a simple and fool-proof mechanism.

Referring to FIGS. 1–3, hoisting assembly 244 comprises hydraulic hoisting cylinder-piston members 245 and 246. Member 245 comprises a cylinder 245a that is fitted with an internal piston (not shown) connected to a piston rod 245b. Likewise, member 246 comprises a cylinder 246a that is fitted with an internal piston (not shown) connected to a piston rod 246b. Cylinders 245a and 246a are connected to member 38 of well 36 by pins 247a and 247b in the manner shown in FIG. 2. Piston rods 245b and 246b are connected to a hoisting frame 248 by means of pins 249a and 249b, respectively. Hoisting frame 248 is welded to section 168 of the boom. The raising and lowering of the boom is controlled through cylinder-piston members 245 and 246 by conventional hydraulic control apparatus powered by engine 28. It should be noted that well 36 is made wide enough to accommodate a substantial portion of cylinder-piston members 245 and 246. By enabling these members to be located in the well, the center of gravity of the vehicle is lowered, thereby helping to stabilize the vehicle and increasing its effective load-carrying capacity.

Referring to FIGS. 4–7, load-carrying assembly 250 comprises a drop block 251 that supports a hook 252. The operation of the drop block is controlled by a pulley 254 having an axis of rotation 256; a pulley 258 that is rotatably mounted on support member 202 by a rod 260; a pulley 262 that is rotatably connected to wall 180 by a rod 264; a slanted pulley 266 that is rotatably mounted to wall 172 by a rod 268; and a rotatable drum 270 having an axis of rotation 272 that is mounted to wall 172 by a bracket 274. (FIG. 1). The rotation of drum 270 is hydraulically controlled and can be operated by a driver from the cab. A cable 275 is looped around the drum and pulleys and is attached to support member 202 at a point 276. Rotation of drum 270 raises or lowers hook 252. If sections 176 and 184 of the boom are extended outward in the direction of arrow O, pulley 262 is moved outward so that the length of cable 175 between pulleys 258 and 254 is increased. In this manner, hook 252 is maintained substantially at the same elevation above the ground while the boom is extended. The reverse process takes place as the boom is retracted.

Referring to FIGS. 1 and 3, load carrying assembly 250 also comprises a fork assembly 280. Assembly 280 includes a pivot frame 282 that is rotatable around a horizontal pivot rod 284. Frame 282 supports an upper collar 286 on a bracket 287 and a lower collar 288 on a bracket 289. The center lines of the collars define a vertical pivot axis 290. Assembly 280 also comprises a vertical frame 292 that supports upper brackets 293, 294 which comate with collar 286, and lower brackets 295, 296 which comate with collar 288. The brackets and collars are rotatably mounted together by means of locking pins (not shown). Ford members 302 and 304 are connected by support bar 308 that is rotatably mounted on frame 292. (FIG. 9). Frame 292 is rotated with respect to frame 282 by means of a hydraulic rotary actuator 310 that is remotely controlled by the driver from the cab.

As shown in FIG. 3 in phantom line position R, fork members 302 and 304 may be pivoted 90° with respect to their solid line position so that a load L can be simultaneously carried on the fork members and load-carrying platform 16. This unique feature is made possible, in part, by the arrangement of applicants' vehicle by which cab 124 and platform 16 are located on opposite sides of the boom. In addition, the fork can pivot in the direction of arrow P to position L shown in phantom in FIG. 3 in order to pick up skewed loads. Of course, a non-pivoting fork such as fork 292A (FIG. 10) could also be used if the advantages of pivoting are not desired.

Figure 8:
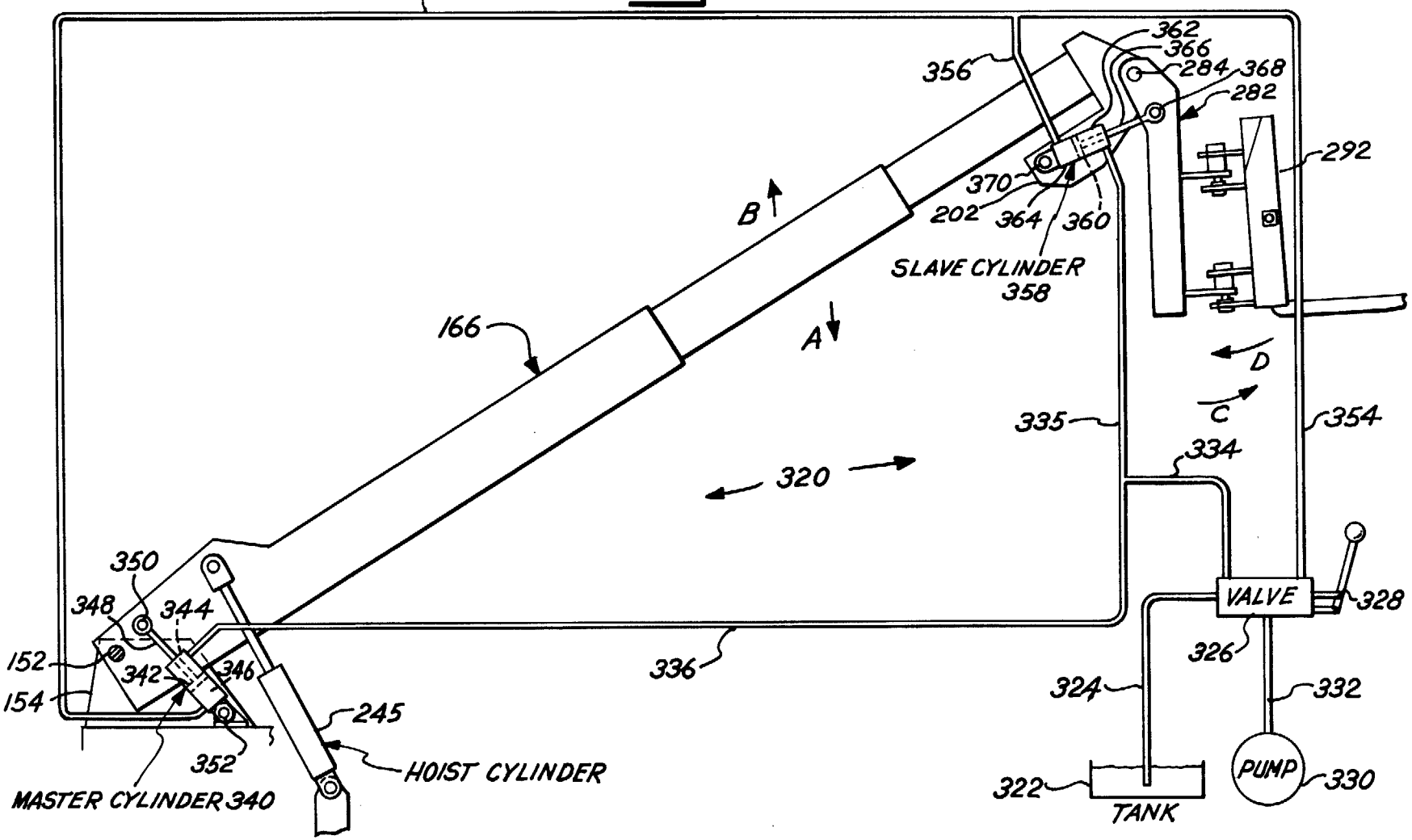
FIG. 8 is a schematic drawing of the boom, a hoisting assembly for the boom, and a fork attitude control system which maintains the fork substantially horizontal to the grade level as the boom is raised and lowered.

Referring to FIG. 8, load-carrying assembly 250 also comprises a fork attitude control system 320. System 320 includes a tank of hydraulic fluid 322 and a tube 324 which connects the fluid to an operating valve 326. The operating valve is controlled by an operating handle 328. The hydraulic fluid is maintained under pressure by a pump 330 that is connected to valve 326 through a tube 332. Pressurized hydraulic fluid flows through tube 334 and through branch tubes 335 and 336.

A master cylinder 340 is fitted with a piston 342 which divides the cylinder into an upper chamber 344 and a lower chamber 346. Piston 342 is connected to a piston rod 348 that is rotatably mounted to boom 166 through a pin 350. Cylinder 340 is likewise rotatably mounted on the frame of the vehicle by a pin 352. Upper chamber 344 is connected to tube 336 and lower chamber 346 is connected to a tube 354 that returns hydraulic fluid to valve 326 and also transmits the fluid to a branch tube 356.

A slave cylinder 358 is fitted with a piston 360 that divides the cylinder into an upper chamber 362 and a lower chamber 364. The piston is connected to a piston rod 366 that is rotatably mounted to vertical frame 282 by a pin 368. Cylinder 358 is rotatably mounted to support member 202 by a pin 370.

The control system operates as follows:

As boom 166 is being raised by cylinder-piston members 245 and 246, piston 342 is raised so that hydraulic fluid flows through tube 336 to upper chamber 362 of slave cylinder 358. As a result, piston 360 moves toward pin 370 so that frame 282 moves in the direction of arrow D, thereby maintaining any load held on the fork members in a substantially horizontal plane. If the boom is lowered in the direction of arrow A, piston 342 in master cylinder 340 is moved downward so that the hydraulic fluid is transferred through tube 354 into lower chamber 364 of slave cylinder 358. Piston 360 then is moved toward pin 368 so that frame 282 is rotated in the direction of arrow C. As a result, any load carried on the fork members is maintained in a substantially horizontal plane as the boom is lowered. Valve 326 and operating handle 328 are arranged so that the above-described operation of the master and slave cylinders can be overridden and so that the frame 282 can be manually rotated in the direction of either arrow C or arrow D.

A vehicle made in accordance with the invention is capable of performing a variety of material-handling operation. As shown in FIG. 9, a load can be lifted by drop block 251 while the fork is attached to the boom. This is an important feature because it permits either the drop block or the fork to be used without disassembling or assembling any components. FIG. 9 also illustrates configurations of well 36 and drum 270 that are somewhat different from the like components shown in the other figures. FIGS. 10 and 13 illustrate the unobstructed vision enjoyed by the driver as a load is being carried near ground level. This is an important feature when the vehicle is used in a warehouse or stock-piling yard. FIG. 11 illustrates the cooperation of boom 166, pivot assembly 150, and well 36 so that a load can be maneuvered below grade level G. FIG. 12 illustrates the height to which the boom is extendible for placing a load on top of a building.

Those skilled in the art will recognize that the preferred embodiment described herein is merely exemplary of the preferred practice of the invention which can be altered and modified without departing from the true spirit and scope of the invention as defined in the claims.

What we claim is:

1. A self-propelled, low profile vehicle for enabling a driver to carry and maneuver a load over a grade surface comprising in combination:

a vehicle body having a front end and a rear end;

front axle means coupled to the vehicle body and having first end portion, a second end portion, and an axis of rotation;

rear axle means coupled to the vehicle body substantially parallel to the front axle means and having a first end portion, a second end portion, and an axis of rotation, the axes of rotation of the [first] *front* and [second] *rear* axle means defining a first plane;

a first front wheel coupled to the first end portion of the front axle means and having an outer periphery defining a first circle having an upper point;

a second front wheel coupled to the second end portion of the front axle means and having an outer periphery defining a second circle having an upper point;

a first rear wheel coupled to the first end portion of the rear axle means and having an outer periphery defining a third circle having an upper point;

a second rear wheel coupled to the second end portion of the rear axle means and having an outer periphery defining a fourth circle having an upper point, the upper points of the first, second, third and fourth circles defining a second plane, and the points of the third and fourth circles closest to the front axle means lying in a third plane perpendicular to the second plane;

pivoting means defining a pivot axis located above the first plane and to the rear of the third plane, said pivot axis lying in a fourth plane parallel to the first plane;

a boom mounted on the pivot axis to rotate in an operating plane substantially perpendicular to the first plane, said boom extending cantilever-fashion from the pivot axis over the front axle means to a load-bearing end;

carrying means mounted on the load bearing end for carrying the load;

hydraulic means for moving the boom in the operating plane;

a source of power for moving the vehicle over the grade surface and for supplying power to the hydraulic means;

a cab for the driver positioned entirely on a first side of the operating plane;

a well in the vehicle body positioned below the boom, said well having a lower member extending below the fourth plane for receiving the boom when the boom is pivoted downward toward the front axle means, [whereby the load can be maneuvered below the grade surface] *said pivoting means and said well cooperating to define means for enabling the load to be maneuvered below the grade surface*; and a load-carrying platform positioned on the vehicle body above the first plane entirely on a second side of the operating plane opposite the first side of the operating plane, so that the well is positioned between the cab and the platform [and wherein the boom is extendible and retractable] *said well further defining means for enabling the boom to be extensible and retractable therein.*

2. A vehicle, as claimed in claim 1, and further comprising steering means located within the cab and linked to at least two of the wheels for controlling the movement of the vehicle, said steering means having an upper point lying in a fifth plane parallel to the first plane.

3. A vehicle, as claimed in claim 2, wherein the pivot axis is positioned between the second plane and the fifth plane, whereby the vision of the driver is substantially unobstructed when the vehicle is used to carry the load adjacent the grade surface and the center of gravity is maintained at a low level.

4. A vehicle as claimed in claim 1, wherein the hydraulic means is located in part in the well, whereby the center of gravity of the vehicle is lowered.

5. A vehicle, as claimed in claim 1, wherein the source of power is located at least in part below the second plane, whereby the center of gravity of the vehicle is lowered.

6. A vehicle, as claimed in claim 5, wherein the source of power is located between the first wheel and the third wheel.

7. A vehicle, as claimed in claim 1, wherein the boom comprises:

a fixed section;

a first movable section telescoped inside the fixed section;

a second movable section telescoped inside the first movable section;

a first pulley movable with the first movable section;

first chain means looped around the first pulley, said first chain means having a first end connected to the fixed section and a second end connected to the second movable section;

a second pulley movable with the first movable section;

second chain means looped around the second pulley, said second chain means having a first end connected to the second movable section and a second end connected to the fixed section;

hydraulic extension means having a first end connected to the fixed section and a second end connected to the first movable section for moving the first movable section outward and inward with respect to the fixed section, whereby the first pulley and first chain means simultaneously move the second movable section outward as the first movable section is moved outward and the second pulley and second chain means simultaneously move the second movable section inward as the first movable section is moved inward.

[8. A vehicle, as claimed in claim 1, wherein the carrying means comprises a support positioned at the load-bearing end of the boom, a fork and a drop block mounted on the support, and means for maintaining the drop block at a constant height above the grade surface as the boom is extended and retracted.]

9. A vehicle, as claimed in claim 1, wherein the steering means comprises a steering wheel positioned so that the driver normally faces toward the front end of the vehicle body, so that the line of sight between the driver and the load is substantially unobstructed irrespective of the manner in which the boom is moved in the operating plane.

10. A vehicle, as claimed in claim [8] *23* wherein the carrying means further comprises means for maintaining the fork substantially parallel to the grade surface as the boom is raised and lowered.

11. A vehicle, as claimed in claim [8] *23* wherein the carrying means comprises means for pivoting the fork around a substantially vertical axis so that the load can be supported simultaneously on the fork and the load-carrying platform.

12. A vehicle, as claimed in claim [8] *23* wherein the fork is fixed about a vertical axis.

13. A vehicle, as claimed in claim 1, wherein the source of power comprises an internal combustion engine located below the well.

14. A vehicle, as claimed in claim 13, and further comprising a service compartment located under the cab and accessible from the outside of the vehicle to one side of the cab, whereby the oil level of the engine can be checked without lifting the well to expose the engine.

*15. A self-propelled, low profile vehicle for enabling a driver to carry and maneuver a load over a grade surface comprising, in combination:*

*a vehicle body having a front end and a rear end;*

*first axle means coupled to the vehicle body and having a first end portion, a second end portion, and an axis of rotation;*

*second axle means coupled to the vehicle body substantially parallel to the first axle means and having a first end portion, a second end portion, and an axis of rotation, the axes of rotation of the first and second axle means defining a first plane;*

*a first wheel coupled to the first end portion of the first axle means and having an outer periphery defining a first circle having an upper point;*

*a second wheel coupled to the second end portion of the first axle means and having an outer periphery defining a second circle having an upper point;*

*a third wheel coupled to the first end portion of the second axle means and having an outer periphery defining a third circle having an upper point;*

*a fourth wheel coupled to the second end portion of the second axle means and having an outer periphery defining a fourth circle having an upper point, the upper points of the first, second, third and fourth circles defining a second plane, and the points of the third and fourth circles closest to the first axle means lying in a third plane perpendicular to the second plane;*

*pivoting means defining a pivot axis located above the first plane and to the rear of the third plane, said pivot axis lying in a fourth plane parallel to the first plane;*

*a boom mounted on the pivot axis to rotate in an operating plane substantially perpendicular to the first plane, said boom extending cantilever-fashion from the pivot axis over the first axle means to a load-bearing end;*

*carrying means mounted on the load bearing end for carrying the load;*

*hydraulic means for moving the boom in the operating plane;*

*a source of power for moving the vehicle over the grade surface and for supplying power to the hydraulic means;*

*a cab for the driver positioned entirely on a first side of the operating plane;*

*a central depressed portion defined in the vehicle body positioned below the boom, said central depressed portion having a lower member extending below the fourth plane for receiving the boom when the boom is pivoted downwardly said pivoting means and said central depressed portion cooperating to define means for enabling the load to be maneuvered below the grade surface; and*

*a frame structure positioned on the vehicle body above the first plane entirely on a second side of the operating plane opposite the first side of the operating plane, so that the central depressed portion is positioned between the cab and the frame structure said central depressed portion further defining means for enabling the boom to be extensible and retractable therein.*

*16. A vehicle, as claimed in claim 15, and further comprising steering means located within the cab and linked to at least two of the wheels for controlling the directional movement of the vehicle, said steering means having an upper point in a fifth plane and wherein the pivot axis is positioned between the second plane and the fifth plane, whereby the vision of the driver is substantially unobstructed when the vehicle is used to carry a load adjacent the grade surface and the center of gravity is maintained at a low level.*

*17. A vehicle, as claimed in claim 15, wherein the hydraulic means is located at least partially in the central depressed portion, and wherein the source of power is located at least partially below the second plane, whereby the center gravity of the vehicle is lowered.*

*18. A vehicle, as claimed in claim 15, wherein the boom comprises a fixed section; a first movable section telescoped inside the fixed section; a second movable section telescoped inside the first movable section; a first pulley movable with the first movable section; first chain means looped around the first pulley, said first chain means having a first end connected to the fixed section and a second end connected to the second movable section; a second pulley movable with the first movable section; second chain means looped around the second pulley, said second chain means having a first end connected to the second movable section and a second end connected to the fixed section; hydraulic extension means having a first end connected to the fixed section and a second end connected to the first movable section for moving the first movable section outward and inward with respect to the fixed section, whereby the first pulley and first chain means simultaneously move the second movable section outward as the first movable section is moved outward and the second pulley and second chain means simultaneously move the second movable section inward as the first movable section is moved inward.*

*19. A self-propelled, low profile vehicle for enabling a driver to carry and maneuver a load over a grade surface comprising, in combination:*

*a vehicle body having a front end and a rear end;*

*first axle means coupled to the vehicle body and having a first end portion, a second end portion, and an axis of rotation;*

*second axle means coupled to the vehicle body substantially parallel to the first axle means and having a first end portion, a second end portion, and an axis of rotation, the axes of rotation of the first and second axle means defining a first plane;*

*a first wheel coupled to the first end portion of the first axle means and having an outer periphery defining a first circle having an upper point;*

*a second wheel coupled to the second end portion of the first axle means and having an outer periphery defining a second circle having an upper point;*

*a third wheel coupled to the first end portion of the second axle means and having an outer periphery defining a third circle having an upper point;*

*a fourth wheel coupled to the second end portion of the second axle means and having an outer periphery defining a fourth circle having an upper point, the upper points of the first, second, third and fourth circles defining a second plane, and the points of the third and fourth circles closest to the first axle means lying in a third plane perpendicular to the second plane;*

*pivoting means defining a pivot axis located above the first plane and to the rear of the third plane, said pivot axis lying in a fourth plane parallel to the first plane;*

*a boom mounted on the pivot axis to rotate in an operating plane substantially perpendicular to the first plane, said boom extending cantilever-fashion from the pivot axis over the first axle means to a load-bearing end;*

*carrying means mounted on the load bearing end for carrying the load, said carrying means comprising a support position at the load bearing end of the boom, a fork and a drop block mounted on the support and means for maintaining the drop block at a constant height above the grade surface as the boom is extended and retracted;*

*hydraulic means for moving the boom in the operating plane;*

*a source of power for moving the vehicle over the grade surface and for supplying power to the hydraulic means;*

*a cab for the driver positioned entirely on a first side of the operating plane;*

*a central depressed portion defined in the vehicle body positioned below the boom, said central depressed portion having a lower member extending below the fourth plane for receiving the boom when the boom is pivoted downwardly whereby the load can be maneuvered below the grade surface; and*

*a frame structure positioned on the vehicle body above the first plane entirely on a second side of the operating plane opposite the first side of the operating plane, so that the central depressed portion is positioned between the cab and the frame structure and wherein the boom is extensible and retractable.*

*20. A vehicle, as claimed in claim 15, wherein the steering means comprises a steering wheel positioned so that the driver normally faces toward the front end of the vehicle body, so that the line of sight between the driver and the load is substantially unobstructed irrespective of the manner in which the boom is moved in the operating plane.*

*21. A vehicle, as claimed in claim 19, wherein the carrying means further comprises means for maintaining the fork substantially parallel to the grade surface as the boom is raised and lowered.*

*22. A vehicle, as claimed in claim 19, wherein the fork is fixed about a vertical axis.*

*23. A self-propelled, low profile vehicle for enabling a driver to carry and maneuver a load over a grade surface comprising in combination:*

*a vehicle body having a front end and a rear end;*

*front axle means coupled to the vehicle body and having first end portion, a second end portion, and an axis of rotation;*

*rear axle means coupled to the vehicle body substantially parallel to the front axle means and having a first end portion, a second end portion, and an axis of rotation the axes of rotation of the front and rear axle means defining a first plane;*

*a first front wheel coupled to the first end portion of the front axle means and having an outer periphery defining a first circle having an upper point;*

*a second front wheel coupled to the second end portion of the front axle means and having an outer periphery defining a second circle having an upper point;*

*a first rear wheel coupled to the first end portion of the rear axle means and having an outer periphery defining a third circle having an upper point;*

*a second rear wheel coupled to the second end portion of the rear axle means and having an outer periphery defining a fourth circle having an upper point, the upper points of the first, second, third and fourth circles defining a second plane, and the points of the third and fourth circles closest to the front axle means lying in a third plane perpendicular to the second plane;*

*pivoting means defining a pivot axis located above the first plane and to the rear of the third plane, said pivot axis lying in a fourth plane parallel to the first plane;*

*a boom mounted on the pivot axis to rotate in an operating plane substantially perpendicular to the first plane, said boom extending cantilever-fashion from the pivot axis over the front axle means to a load-bearing end;*

*carrying means mounted on the load bearing end for carrying the load, said carrying means comprising a support position at the load bearing end of the boom, a fork and a drop block mounted on the support and means for maintaining the drop block at a constant height above the grade surface as the boom is extended and retracted;*

*hydraulic means for moving the boom in the operating plane;*

*a source of power for moving the vehicle over the grade surface and for supplying power to the hydraulic means;*

*a cab for the driver positioned entirely on a first side of the operating plane;*

*a well in the vehicle body positioned below the boom, said well having a lower member extending below the fourth plane for receiving the boom when the boom is pivoted downward toward the front axle means, whereby the load can be maneuvered below the grade surface; and*

*a load-carrying platform positioned on the vehicle body above the first plane entirely on a second side of the operating plane opposite the first side of the operating plane, so that the well is positioned between the cab and the platform and wherein the boom is extendible and retractable.*

* * * * *